(12) United States Patent
Israel

(10) Patent No.: US 8,981,922 B2
(45) Date of Patent: Mar. 17, 2015

(54) REAR END COLLISION AVOIDANCE SYSTEM

(71) Applicant: Bruno Israel, Kinderhook, NY (US)

(72) Inventor: Bruno Israel, Kinderhook, NY (US)

(*) Notice: Subject to any disclaimer, the term of this patent is extended or adjusted under 35 U.S.C. 154(b) by 0 days.

(21) Appl. No.: 13/955,819

(22) Filed: Jul. 31, 2013

(65) Prior Publication Data

US 2015/0015392 A1 Jan. 15, 2015

Related U.S. Application Data

(60) Provisional application No. 61/845,011, filed on Jul. 11, 2013.

(51) Int. Cl.
*B60Q 1/50* (2006.01)
*B60Q 1/26* (2006.01)
*B60Q 1/44* (2006.01)

(52) U.S. Cl.
CPC ........................ *B60Q 1/441* (2013.01)
USPC ............................ 340/467; 340/468; 340/473

(58) Field of Classification Search
CPC ........... B60Q 1/444; B60Q 1/44; G08G 1/162
USPC .................................................. 340/465–479
See application file for complete search history.

(56) References Cited

U.S. PATENT DOCUMENTS

| 2,740,105 | A | | 3/1956 | Dorfman et al. |
| 4,149,141 | A | | 4/1979 | Tanimura |
| 4,970,493 | A | * | 11/1990 | Yim ............................... 340/468 |
| 5,798,691 | A | * | 8/1998 | Tim Kao ........................ 340/479 |
| 6,642,842 | B1 | * | 11/2003 | Khamis .......................... 340/467 |
| 8,130,737 | B2 | * | 3/2012 | Singh et al. .................... 370/338 |
| 2002/0190854 | A1 | * | 12/2002 | Swan ............................. 340/467 |
| 2003/0043033 | A1 | | 3/2003 | Lee |
| 2006/0125615 | A1 | | 6/2006 | Song |
| 2008/0258898 | A1 | | 10/2008 | Yang |
| 2010/0085181 | A1 | | 4/2010 | Brooking et al. |

OTHER PUBLICATIONS

International Search Report and Written Opinion of international Application No. PCT/US2014/046369, dated Nov. 14, 2014.

* cited by examiner

*Primary Examiner* — Steven Lim
*Assistant Examiner* — Omeed Alizada
(74) *Attorney, Agent, or Firm* — Heslin Rothenberg Farley & Mesiti P.C.

(57) ABSTRACT

A rear collision prevention system includes: a linkage coupled to a gas pedal, the linkage capable of sensing the position of the gas pedal, the linkage communicatively coupled to a transmitter, a transmitter with at least a first channel and a second channel, where the first channel receives a signal from the linkage when the gas pedal is depressed, and the second channel receives a signal when the gas pedal is released. The system also includes a receiver communicatively coupled to the transmitter. The receiver receives signals from the first channel and the second channel of the transmitter. An illumination device is communicatively coupled to the receiver, and the device illuminates in a first color responsive to the receiver receiving a signal on the first channel and illuminates in a second color responsive to the receiver receiving a signal on the second channel.

20 Claims, 3 Drawing Sheets

REAR END COLLISION AVOIDANCE SYSTEM

CROSS REFERENCE TO RELATED APPLICATION

The present application claims priority under 35 U.S.C. §119 of Provisional Application No. 61/845,011, filed Jul. 11, 2013, entitled "Rear End Collision Avoidance System," which is incorporated herein by reference in its entirety.

BACKGROUND

An aspect of the technique relates to a warning system designed to decrease instances of rear end collisions of motor vehicles.

Rear-end collision accidents have gradually increased together with the increment in the number and running speed of motorized vehicles in recent years. Many of these traffic accidents occur because a driver may be unaware of the activities of the driver in front of this driver. As a result, when the driver in front stops short, the driver in the rear does not have enough time to react and negotiate his or her speed, resulting in a rear end collision.

BRIEF SUMMARY

Shortcomings of the prior art are overcome and additional advantages are provided through the provision of a system for providing a warning to driver's in first vehicle to the rear of a second vehicle by indicating the movement of the second vehicle by providing additional rear lighting on the second vehicle.

Embodiments of the invention comprise a rear collision prevention system, a vehicle with a rear collision prevention system, and a method of installing a rear collision prevention system. This system includes a linkage coupled to a gas pedal that is capable of sensing the position of the gas pedal and that is coupled to a transmitter with at least a first channel and a second channel. The first channel receives a signal from the linkage when the gas pedal is depressed, and the second channel receives a signal when the gas pedal is released. In the system, a receiver is communicatively coupled to the transmitter and receives signals from the first channel and the second channel of the transmitter. At least one illumination device is communicatively coupled to the receiver, and the device illuminates in a first color responsive to the receiver receiving a signal on the first channel and illuminates in a second color responsive to the receiver receiving a signal on the second channel.

Additional features are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

Embodiments of the invention represents an improvement over prior systems and methods for preventing and/or decreasing the instances of rear-end collisions by providing a visual warning to drivers that extends the reaction time of a driver behind a vehicle in front of it, that changes speeds, including but not limited to, stopping suddenly. Embodiments of the present invention indicate when a vehicle is in a continuous state of motion and/or accelerating, and/or whether the motor vehicle is in a decreased or constant state of motion, such as coasting or idling. Brake lights, which are part of commercially available vehicles, indicate when a driver is braking, but by supplementing the lighting on the rear of a motor vehicle, the motor vehicle can provide a driver to the rear with more information about the activities of the driver, such as those enumerated above.

Embodiments of the invention comprise a rear collision prevention system, a vehicle with a rear collision prevention system, and a method of installing a rear collision prevention system. This system includes a linkage coupled to a gas pedal that is capable of sensing the position of the gas pedal and that is coupled to a transmitter with at least a first channel and a second channel. The first channel receives a signal from the linkage when the gas pedal is depressed, and the second channel receives a signal when the gas pedal is released. In the system, a receiver is communicatively coupled to the transmitter and receives signals from the first channel and the second channel of the transmitter. At least one illumination device is communicatively coupled to the receiver, and the device illuminates in a first color responsive to the receiver receiving a signal on the first channel and illuminates in a second color responsive to the receiver receiving a signal on the second channel.

In the embodiments discussed, the supplemental lights are yellow and green because these colors have meaning to drivers, a yellow light being a "caution" signal, and the green light being a "go" signal. Given that brake lights are red in color and indicate "stop," to a driver behind a braking car, by utilizing a yellow light and a green light, the embodiments discussed offer a consistent message to drivers who obey traffic signals, such as traffic lights. However, despite the embodiments discussed below, any commercially available light color can be utilized in further embodiments of the present invention.

Although the yellow light and the green light discussed in the embodiments and figures below are referred to as singular, and/or functions of the same illumination device, one of skill in the art will recognize that more than one of each colored light, and/or one or more lights capable of projecting more than one color can be substituted, in further embodiments of the present invention.

Figure 1:
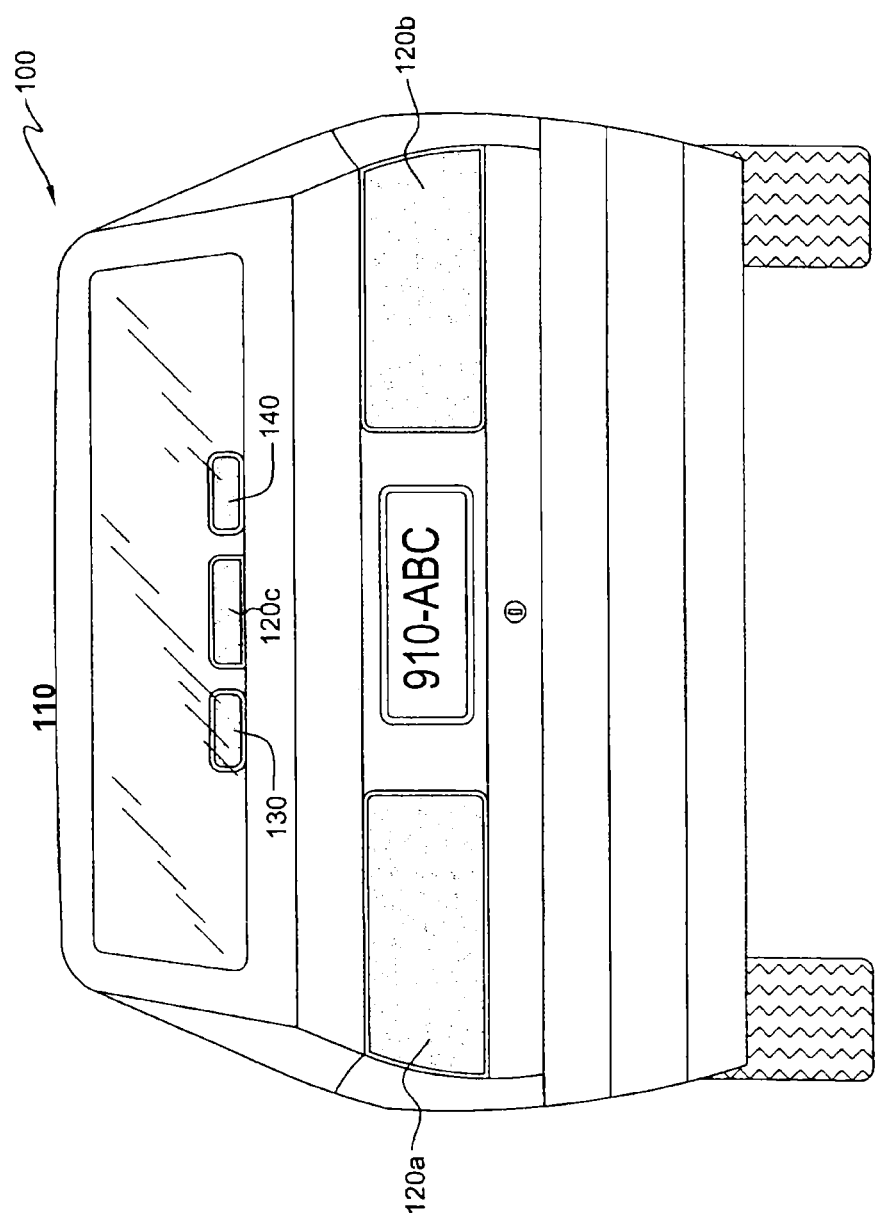
FIG. 1 depicts one example of an aspect of the present invention.

FIG. 1 is an embodiment of an aspect of the present invention and depicts the rear end 110 of a motor vehicle 100 fitted with this embodiment of the present invention. As recognized by one of skill in the art, the embodiment of FIG. 1 and further embodiments of the invention are applicable to a full range of motor vehicles. The motor vehicle 100 in FIG. 1 is an example for illustrative purposes.

As with the majority of motor vehicles on the road today, visible on the rear of the motor vehicle 110 are standard brake lights 120a-120c, which turn red when the vehicle 100 comes to a stop. The exemplary vehicle 100 is fitted with three brake lights 120a-120c, however.

In the embodiment of FIG. 1, next to the third brake light 120c or the rear of the motor vehicle 110 are two additional lights, a green light 130 and a yellow light 140. The green light 130 and the yellow light 140 may be comprised of any type of preferably compact light that emits definitive colors, for example, light emitting diodes (LEDs). In an embodiment of the present invention, the green light 130 and the yellow light 140 comprise a two-color LED array.

In an embodiment of the present invention, only one light is on at a given time. Thus, for example, either the green light 130 or the yellow light 140 is illuminated. In an embodiment of the present invention, each light and/or color (if a single illumination device is utilized) is illuminated for a predetermined period of time.

For ease of perception by a driver to the rear of the motor vehicle 110, in the embodiment of FIG. 1, the green light 130 and the yellow light 140 are mounted in the same orientation/direction as the brake lights 120a-120c. Further embodiments of the present invention may include additional configurations for the yellow light 140 and the green light 130, relative to the brake lights 120a-120c, keeping in mind the visibility of the green light 130 and the yellow light 140 to drivers to the rear of the motor vehicle 100.

The green light 130 and the yellow light 140 are coupled to a two channel transmitter (not shown) and a receiver (not shown). In further embodiment of the present invention, a combine transmitter/receiver is used in place of a separate receiver and transmitter.

Returning to FIG. 1, the green light 130 receives signals from one channel, and the yellow light 140 receives signals from the second channel. The transmitter (not shown) receives a signal indicating, in this embodiment, the position a mechanism in the motor vehicle 100, including but not limited to, the gas pedal (not shown) of the motor vehicle 100. The green light 130 and the yellow light 140 are illuminated based upon the signals received via the channels of the transmitter (not shown) and thus, indicate the position of, and/or activity related to, the mechanism, such as the gas pedal (not shown), of the motor vehicle 100.

Figure 2:
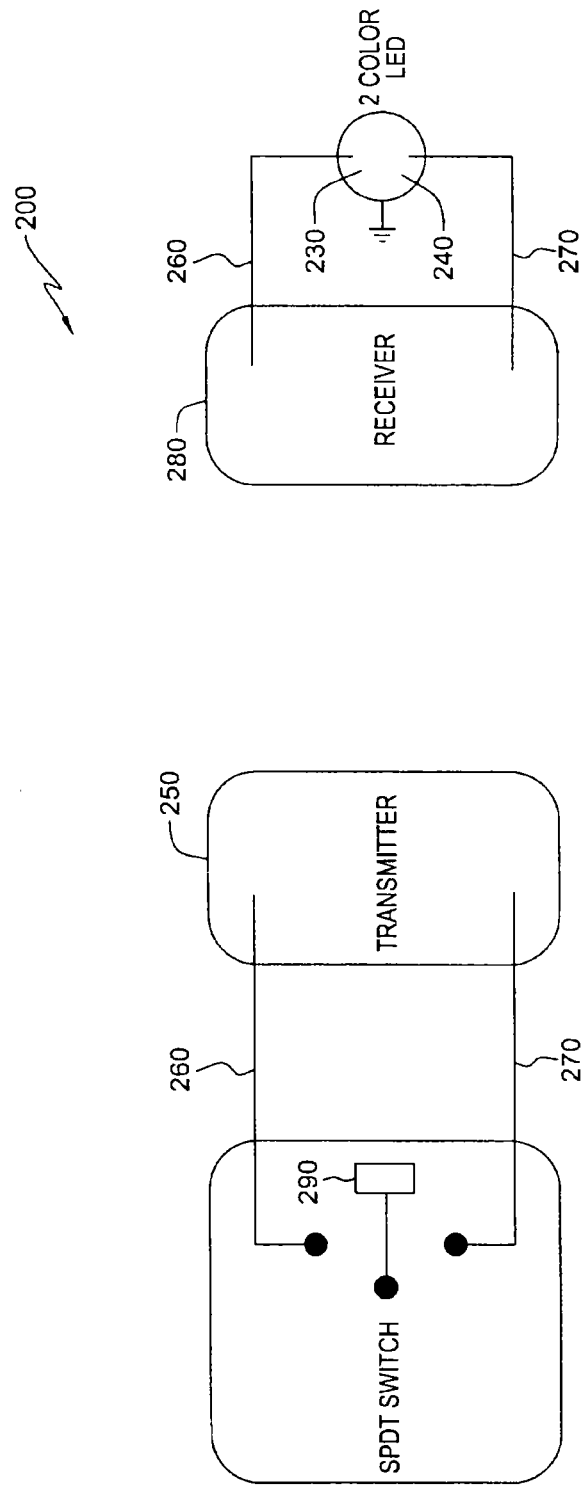
FIG. 2 depicts one or more aspects of an embodiment of the present invention.
Figure 3:
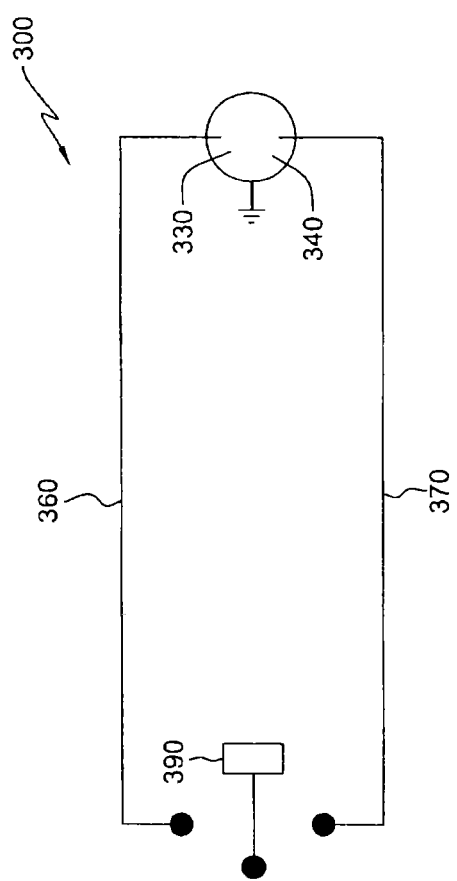
FIG. 3 depicts one or more aspects of an embodiment of the present invention.

A two channel transmitter described in relation to FIGS. 1-3 is used in some embodiments of the present invention. However, one of skill in the art will appreciate that the aspects of the invention can be applied utilizing different transmission configurations, provided that one or more signals is supplied to one or more of the green light 130 and/or the yellow light 140, wherein these lights can be part of a compact arrangement, including but not limited to, a two-color LED array.

FIG. 2 shows the communications system of an embodiment of the present invention in greater detail. FIG. 2 is an embodiment of a wireless system practicing at least one aspect of an embodiment of the invention. FIG. 3, which will be discussed later, is a hard wired system for practicing at least one aspect of an embodiment of the invention.

As described in reference to FIG. 1, in FIG. 2, the green light 230 and the yellow light 240 are each coupled to different channels of a transmitter 250. In this embodiment, a two color LED comprises the green light 230 and the yellow light 240, thus a single LED produces both colors, each color depending upon the signal received. In this embodiment, the green light 230 is coupled to a first channel 260 and the yellow light 240 is coupled to a second channel 270. The signals transmitted over the first channel 260, and the second channel 270, are transmitted wirelessly, utilizing a wirelessly enabled transmitter 250 and receiver 280.

In this embodiment, when the first channel 260 of the transmitter 250 receives a signal, the signal is conveyed via this first channel 260 from the transmitter 250 to the receiver 280 and this signal causes the green light 230 to illuminate. Similarly, when the second channel 270 of the transmitter 250 receives a signal, this signal is conveyed from the transmitter 250 to the receiver 280 and this signal causes the yellow light 240 to illuminate.

In an embodiment of the present invention, the transmitter 250 is coupled to a mechanism 290 that, in response to actions of an operator of the motor vehicle 20, generates a signal in one or more of the first channel 260 and/or the second channel 270 of the transmitter 250.

Referring to FIG. 2, the transmitter 250 is located in the cabin of the motor vehicle 200. Meanwhile, the receiver 280 is communicatively coupled directly or indirectly to the yellow light 240 and the green light 230, supplying the yellow light 240 and/or the green light 230 with signals causing one or more of the yellow light 240 and/or the green light 230 to illuminate. In an embodiment of the present invention, only one light will illuminate at a given time and the illumination of each of the green light 230 and the yellow light 240 is dependent upon the other light not being illuminated. The mechanism 290 in the motor vehicle 200 generates signals so that the lights can alert drivers to the rear of the motor vehicle 200 to the activities of the operator of the motor vehicle 200, for the purpose of reducing the instances of rear end collisions. For example, in an embodiment of the present invention, the mechanism 290 triggers the yellow light 240 to indicate to the driver to the rear to proceed with caution. The mechanism 290 triggers the green light to indicate to drivers to the rear that the motor vehicle 200 is accelerating and/or that the driver is maintaining a constant speed and/or acceleration.

In an embodiment of the present invention, the mechanism 290 comprises a gas pedal. In this embodiment, when the mechanism 290 is depressed, a signal is given to the first channel 260 of the transmitter 250, which is sent to the receiver 280, which in turn gives the signal to the green light 230, illuminating the green light 230. When the mechanism 290 is a gas pedal and the gas pedal is not depressed, but the engine is on, e.g., the motor vehicle 200 is coasting or idling, a signal is given through the second channel 270 of the transmitter 250, which is sent to the receiver 280, which gives a signal to the yellow light 240, illuminating the yellow light 240.

As aforementioned, in various embodiments of the present invention the green light 230 and the yellow light 240 comprise a two-color LED array. In an embodiment where the green light 230 and the yellow light 240 comprise a two-color LED array, and the mechanism 290 is a gas pedal, when an operator of the motor vehicle 200 depresses the mechanism 290, a signal is given to the first channel 260 of the transmitter 250, which is sent to the receiver 280, which in turn gives the signal to the green color of the LED. When the mechanism 290 is a gas pedal and the gas pedal is not depressed, but the engine is on, e.g., the motor vehicle 200 is coasting or idling, a signal is given through the second channel 270 of the transmitter 250, which is sent to the receiver 280, the LED receives the signal and replaces the green color light with a yellow color light.

FIG. 3 is a hard wired embodiment of the present invention. In this embodiment, signals are transmitted directly from the mechanism 390 to the green light 330 and the yellow light 340, without the need for a wireless transmitter and receiver.

In FIG. 3, the gas pedal is the mechanism 390. Thus, in this embodiment, when an operator depresses the gas pedal 390, a signal is communicated via a first channel 360 to the green light 330. When the gas pedal is released, so that the motor vehicle is coasting or idling, a signal is communicated via a second channel 370 to the yellow light 340.

In embodiments where the gas pedal comprises the mechanism, the motion of the gas pedal can be conveyed in to the transmitter through a number of different avenues, including but not limited to, a linkage to the gas pedal, an SPDT Switch, the throttle positioning sensor (TPS), the vacuum line, the mass flow air sensor, the manifold absolute pressure, and/or the closed throttle switch. Each of these mechanisms can be utilized to sense the position of the gas pedal, convey a signal to the transmitter, and thus, ultimately, indicate movement of the vehicle. By understanding the movement of a vehicle, a driver behind the vehicle has more time to react. The "caution" of the yellow light and the "go" of the green light provide additional intelligence beyond the red brake light, which indicates that the driver is already trying to stop, and in some situations, the driver behind, who sees this light, may already have no time to react.

One of skill in the art will recognize that in further embodiments of the invention, additional electrical components can act as intermediaries and/or linkages between the mechanism, such as the gas pedal, and the channels of the transmitter.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A rear collision prevention system comprising:
   a mechanical linkage coupled to a gas pedal, the mechanical linkage configured to sense the position of the gas pedal, the mechanical linkage communicatively coupled to a transmitter;
   the transmitter comprising at least a first channel and a second channel, wherein the first channel receives a signal from the mechanical linkage when the gas pedal is depressed, and the second channel receives a signal when the gas pedal is released;
   a receiver communicatively coupled to the transmitter, wherein the receiver receives signals from the first channel and the second channel of the transmitter;
   at least one illumination device communicatively coupled to the receiver, wherein the device illuminates in a first color responsive to the receiver receiving a signal on the first channel and illuminates in a second color responsive to the receiver receiving a signal on the second channel,
   wherein the rear collision prevention system functions independently from a braking system and a transmission in a vehicle.

2. The rear collision prevention system of claim 1, wherein the mechanical linkage comprises at least one of: an SPDT Switch, a throttle positioning sensor (TPS), a vacuum line, a mass flow air sensor, manifold absolute pressure, or a throttle switch.

3. The rear collision prevention system of claim 1, wherein the at least one illumination device comprises an LED.

4. The rear end collision prevention system of claim 1, wherein the at least one illumination device comprises a first illumination device and a second illumination device, wherein the first illumination device illuminates in the first color responsive to the receiver receiving a signal on the first channel, and the second illumination device illuminates in the second color, responsive to the receiver receiving a signal on the second channel.

5. The rear end collision prevention system of claim 1, wherein the first color is a green and the second color is a yellow.

6. The rear end collision prevention system of claim 1, wherein the at least one illumination device illuminates in the first color and the second color alternatively.

7. The rear end collision prevention system of claim 1, wherein the illumination device is affixed to a vehicle proximate to a brake light.

8. The rear end collision prevention system of claim 1, wherein the transmitter and the receiver communicate through one of: a wireless connection, or a wired connection.

9. The rear end collision prevention system of claim 1, wherein based on the receiving the signal on the first channel, the illumination device is illuminated in the first color for a first predetermined period of time or until receiving the signal on the second channel, and based on the receiving the signal on the second channel, the illumination device is illuminated in the second color for a second predetermined period of time, or until receiving the signal on the first channel.

10. A vehicle with a rear end collision prevention system comprising:
   a gas pedal communicatively coupled to a mechanical linkage, the mechanical linkage configured to sense the position of the gas pedal, the mechanical linkage communicatively coupled to a transmitter;
   the transmitter comprising at least a first channel and a second channel, wherein the first channel receives a signal from the mechanical linkage when the gas pedal is depressed, and the second channel receives a signal when the gas pedal is released;
   a receiver communicatively coupled to the transmitter, wherein the receiver receives signals from the first channel and the second channel of the transmitter;
   at least one illumination device communicatively coupled to the receiver, wherein the device illuminates in a first color responsive to the receiver receiving a signal on the first channel and illuminates in a second color responsive to the receiver receiving a signal on the second channel, wherein the rear collision prevention system functions independently from a braking system and a transmission in the vehicle.

11. The vehicle with a rear end collision prevention system of claim 10, further comprising a brake light, and wherein the at least one illumination device is affixed to the back of the vehicle, proximate to a brake light.

12. The vehicle with a rear end collision prevention system of claim 10, further comprising a brake light, wherein the at least one illumination device is mounted proximate to a brake light and face the same direction as the brake light.

13. The vehicle with a rear end collision prevention system of claim 10, wherein the mechanical linkage comprises at least one of: an SPDT Switch, a throttle positioning sensor (TPS), a vacuum line, a mass flow air sensor, manifold absolute pressure, or a throttle switch.

14. The vehicle with a rear end collision prevention system of claim 10, wherein the at least one illumination device comprises an LED.

15. The vehicle with a rear end collision prevention system of claim 10, wherein the at least one illumination device comprises a first illumination device and a second illumination device, wherein the first illumination device illuminates in the first color responsive to the receiver receiving a signal on the first channel, and the second illumination device illuminates in the second color, responsive to the receiver receiving a signal on the second channel.

16. The vehicle with a rear end collision prevention system of claim 10, wherein the first color is a green and the second color is a yellow.

17. The vehicle with a rear end collision prevention system of claim 10, wherein the at least one illumination device illuminates in first color and the second color alternatively.

18. The vehicle with a rear end collision prevention system of claim 10, wherein the transmitter and the receiver communicate through one of: a wireless connection, or a wired connection.

19. The vehicle with a rear end collision prevention system of claim 10, wherein based on the receiving the signal on the first channel, the illumination device is illuminated in the first color for a first predetermined period of time or until receiving the signal on the second channel, and based on the receiving the signal on the second channel, the illumination device is illuminated in the second color for a second predetermined period of time, or until receiving the signal on the first channel.

20. A method of installing a rear end collision system in a motor vehicle, the method comprising:
  electrically coupling a mechanical linkage to a gas pedal capable, the mechanical linkage configured to sense the position of the gas pedal;
  electrically coupling the mechanical linkage to a transmitter, the transmitter comprising at least a first channel and a second channel, wherein the first channel receives a signal from the mechanical linkage when the gas pedal is depressed, and the second channel receives a signal when the gas pedal is released;
  electrically coupling a receiver to the transmitter, wherein the receiver receives signals from the first channel and the second channel of the transmitter;
  electrically coupling a first illumination device to the receiver, wherein the first device illuminates responsive to the receiver receiving a signal on the first channel;
  electrically coupling a second illumination device to the receiver, wherein the second device illuminates responsive to the receiver receiving a signal on the second channel; and
  installing the rear collision system such that the rear collision systems functions independently from a braking system and a transmission in the vehicle.

\* \* \* \* \*